US008667051B2

(12) United States Patent
Schneider

(10) Patent No.: US 8,667,051 B2
(45) Date of Patent: Mar. 4, 2014

(54) REAL-TIME COMMUNICATION PROCESSING METHOD, PRODUCT, AND APPARATUS

(75) Inventor: Eric Schneider, University Heights, OH (US)

(73) Assignee: ESDR Network Solutions LLC, Wilmington, DE (US)

(*) Notice: Subject to any disclaimer, the term of this patent is extended or adjusted under 35 U.S.C. 154(b) by 967 days.

(21) Appl. No.: 09/656,667

(22) Filed: Sep. 7, 2000

(65) Prior Publication Data
US 2008/0016142 A1 Jan. 17, 2008
Related U.S. Application Data

(63) Continuation-in-part of application No. 09/532,500, filed on Mar. 21, 2000, now Pat. No. 7,136,932, and a continuation-in-part of application No. 09/525,350, filed on Mar. 15, 2000, now Pat. No. 6,338,082.

(60) Provisional application No. 60/143,859, filed on Jul. 15, 1999, provisional application No. 60/135,751, filed on May 25, 1999, provisional application No. 60/125,531, filed on Mar. 22, 1999, provisional application No. 60/157,075, filed on Oct. 1, 1999, provisional application No. 60/130,136, filed on Apr. 20, 1999, provisional application No. 60/160,125, filed on Oct. 18, 1999, provisional application No. 60/153,594, filed on Sep. 13, 1999, provisional application No. 60/153,336, filed on Sep. 10, 1999.

(51) Int. Cl.
*G06F 15/16* (2006.01)

(52) U.S. Cl.
USPC ............ 709/203; 386/244; 707/736; 725/32; 725/109; 348/461; 348/465

(58) Field of Classification Search
USPC ......... 709/224, 206, 225, 238, 245, 203, 209, 709/219; 1/217; 715/716, 810, 736; 707/1, 707/2, 3, 100, 104.1, 10, 736; 380/46; 345/418; 379/88.17; 713/162; 725/37, 725/60–61, 112–113, 110, 32, 109; 386/4, 386/244; 348/552, 461, 465
See application file for complete search history.

(56) References Cited

U.S. PATENT DOCUMENTS 4,196,310 A * 4/1980 Forman et al. ................ 380/46
4,486,853 A * 12/1984 Parsons ......................... 345/418
(Continued)

FOREIGN PATENT DOCUMENTS

JP 11085492 A * 3/1999
WO WO9909726 2/1999
(Continued)

OTHER PUBLICATIONS

Internation Publication No. WO 00/07133, Pasqua, Joseph, "Method and System for Applying User Specified Hyperlinks", Priority dated Jul. 28, 1998.*
(Continued)

*Primary Examiner* — Oleg Survillo
(74) *Attorney, Agent, or Firm* — Fitch, Even, Tabin & Flannery LLP

(57) ABSTRACT

The present invention detects indicia, identifiers, or partial URLs to mark up in real time from input sources such as that of radio, television, cable, and other sources that have a digital, analog or digital/analog signal where text can be decoded from. A device receives a broadcast and decodes text data from the broadcast signal. The data is stored and words are parsed from the stored data. The words may be matched against a table of identifiers or rules to determine whether indicia have been detected. If not and it is determined that there is more data, then the next word may be parsed from the stored data. If an identifier or the like has been detected then it may be determined whether the word is a phone number. When the word is a phone number, the number is stored in a phone cache to speed-dial, auto-dial, generate a hyperdial link, or update a phone book. If the word is not a phone number, then it may be determined whether the word is a lottery number, stock symbol and price, zip code, e-mail, domain name, weather and any other indicia types that may be detected to perform an operative function.

29 Claims, 10 Drawing Sheets

(56) References Cited

U.S. PATENT DOCUMENTS

| | | | | |
|---|---|---|---|---|
| 4,754,326 | A * | 6/1988 | Kram et al. | 707/1 |
| 5,362,105 | A * | 11/1994 | Scott | 283/65 |
| 5,446,891 | A * | 8/1995 | Kaplan et al. | 707/2 |
| 5,664,170 | A | 9/1997 | Taylor | |
| 5,721,897 | A * | 2/1998 | Rubinstein | 707/2 |
| 5,764,906 | A | 6/1998 | Edelstein et al. | |
| 5,812,776 | A | 9/1998 | Gifford | |
| 5,815,830 | A * | 9/1998 | Anthony | 707/6 |
| 5,818,935 | A * | 10/1998 | Maa | 380/200 |
| 5,835,087 | A * | 11/1998 | Herz et al. | 715/810 |
| 5,903,864 | A * | 5/1999 | Gadbois et al. | 704/251 |
| 5,907,841 | A * | 5/1999 | Sumita et al. | 1/1 |
| 5,908,467 | A * | 6/1999 | Barrett et al. | 709/218 |
| 5,963,205 | A * | 10/1999 | Sotomayor | 715/531 |
| 5,963,915 | A * | 10/1999 | Kirsch | 705/26 |
| 5,978,806 | A * | 11/1999 | Lund | 707/10 |
| 5,978,842 | A | 11/1999 | Noble et al. | |
| 5,987,464 | A | 11/1999 | Schneider | |
| 6,003,077 | A | 12/1999 | Bawden et al. | |
| 6,006,265 | A * | 12/1999 | Rangan et al. | 709/226 |
| 6,009,459 | A | 12/1999 | Belfiore et al. | |
| 6,014,660 | A | 1/2000 | Lim et al. | |
| 6,018,768 | A | 1/2000 | Ullman et al. | 709/218 |
| 6,021,433 | A * | 2/2000 | Payne et al. | 709/219 |
| 6,023,724 | A | 2/2000 | Bhatia et al. | |
| 6,029,195 | A * | 2/2000 | Herz | 725/116 |
| 6,058,250 | A * | 5/2000 | Harwood et al. | 709/227 |
| 6,061,700 | A * | 5/2000 | Brobst et al. | 715/517 |
| 6,061,734 | A * | 5/2000 | London | 709/238 |
| 6,085,242 | A | 7/2000 | Chandra | |
| 6,092,100 | A * | 7/2000 | Berstis et al. | 709/203 |
| 6,119,234 | A | 9/2000 | Aziz et al. | |
| 6,125,361 | A * | 9/2000 | Chakrabarti et al. | 707/3 |
| 6,134,532 | A * | 10/2000 | Lazarus et al. | 705/14.25 |
| 6,134,588 | A | 10/2000 | Guenthner et al. | |
| 6,148,289 | A | 11/2000 | Virdy | |
| 6,151,624 | A * | 11/2000 | Teare et al. | 709/217 |
| 6,154,600 | A * | 11/2000 | Newman et al. | 386/4 |
| 6,154,771 | A * | 11/2000 | Rangan et al. | 709/217 |
| 6,154,777 | A | 11/2000 | Ebrahim | |
| 6,167,449 | A | 12/2000 | Arnold et al. | |
| 6,173,406 | B1 * | 1/2001 | Wang et al. | 726/3 |
| 6,182,148 | B1 | 1/2001 | Tout | |
| 6,198,511 | B1 * | 3/2001 | Matz et al. | 348/553 |
| 6,199,076 | B1 * | 3/2001 | Logan et al. | 715/501.1 |
| 6,212,565 | B1 | 4/2001 | Gupta | |
| 6,219,709 | B1 * | 4/2001 | Byford | 709/227 |
| 6,229,532 | B1 * | 5/2001 | Fujii | 715/733 |
| 6,230,168 | B1 * | 5/2001 | Unger et al. | 715/501.1 |
| 6,240,555 | B1 * | 5/2001 | Shoff et al. | 725/110 |
| 6,249,817 | B1 * | 6/2001 | Nakabayashi et al. | 709/224 |
| 6,259,771 | B1 * | 7/2001 | Kredo et al. | 379/88.17 |
| 6,269,361 | B1 * | 7/2001 | Davis et al. | 707/3 |
| 6,282,511 | B1 * | 8/2001 | Mayer | 704/270 |
| 6,292,172 | B1 * | 9/2001 | Makhlouf | 345/157 |
| 6,311,214 | B1 * | 10/2001 | Rhoads | 709/217 |
| 6,314,469 | B1 | 11/2001 | Tan et al. | |
| 6,321,222 | B1 * | 11/2001 | Soderstrom et al. | 707/5 |
| 6,324,538 | B1 * | 11/2001 | Wesinger et al. | 707/10 |
| 6,338,082 | B1 | 1/2002 | Schneider | |
| 6,339,786 | B1 * | 1/2002 | Ueda et al. | 709/217 |
| 6,356,898 | B2 * | 3/2002 | Cohen et al. | 707/5 |
| 6,360,256 | B1 | 3/2002 | Lim | |
| 6,366,298 | B1 * | 4/2002 | Haitsuka et al. | 715/736 |
| 6,366,906 | B1 * | 4/2002 | Hoffman | 707/3 |
| 6,385,620 | B1 * | 5/2002 | Kurzius et al. | 707/104.1 |
| 6,412,014 | B1 * | 6/2002 | Ryan | 709/245 |
| 6,421,675 | B1 * | 7/2002 | Ryan et al. | 707/100 |
| 6,430,623 | B1 | 8/2002 | Alkhatib | |
| 6,442,518 | B1 * | 8/2002 | Van Thong et al. | 704/235 |
| 6,442,549 | B1 | 8/2002 | Schneider | |
| 6,449,657 | B2 * | 9/2002 | Stanbach et al. | 709/245 |
| 6,452,609 | B1 * | 9/2002 | Katinsky et al. | 715/716 |
| 6,486,891 | B1 * | 11/2002 | Rice | 715/738 |
| 6,496,981 | B1 * | 12/2002 | Wistendahl et al. | 725/112 |
| 6,505,201 | B1 * | 1/2003 | Haitsuka et al. | 707/10 |
| 6,510,461 | B1 * | 1/2003 | Nielsen | 709/224 |
| 6,605,120 | B1 * | 8/2003 | Fields et al. | 715/513 |
| 6,611,803 | B1 * | 8/2003 | Furuyama et al. | 704/254 |
| 6,615,348 | B1 * | 9/2003 | Gibbs | 713/162 |
| 6,618,726 | B1 * | 9/2003 | Colbath et al. | 707/779 |
| 6,628,314 | B1 * | 9/2003 | Hoyle | 715/854 |
| 6,637,032 | B1 * | 10/2003 | Feinleib | 725/110 |
| 6,668,278 | B1 * | 12/2003 | Yen et al. | 709/218 |
| 6,678,717 | B1 | 1/2004 | Schneider | |
| 6,711,585 | B1 * | 3/2004 | Copperman et al. | 707/104.1 |
| 6,718,321 | B2 * | 4/2004 | Birrell et al. | 707/2 |
| 6,748,375 | B1 * | 6/2004 | Wong et al. | 707/3 |
| 6,760,746 | B1 | 7/2004 | Schneider | |
| 6,766,369 | B1 * | 7/2004 | Haitsuka et al. | 709/224 |
| 6,779,178 | B1 * | 8/2004 | Lloyd et al. | 717/174 |
| 6,836,805 | B1 | 12/2004 | Cook | |
| 6,880,007 | B1 * | 4/2005 | Gardos et al. | 709/225 |
| 6,892,226 | B1 * | 5/2005 | Tso et al. | 709/218 |
| 6,895,402 | B1 * | 5/2005 | Emens et al. | 707/10 |
| 6,895,430 | B1 | 5/2005 | Schneider | |
| 6,901,436 | B1 | 5/2005 | Schneider | |
| 6,931,451 | B1 * | 8/2005 | Logan et al. | 709/231 |
| 6,944,658 | B1 | 9/2005 | Schneider | |
| 6,959,339 | B1 * | 10/2005 | Wu et al. | 709/246 |
| 6,961,700 | B2 * | 11/2005 | Mitchell et al. | 704/235 |
| 6,963,928 | B1 * | 11/2005 | Bagley et al. | 709/245 |
| 6,973,505 | B1 | 12/2005 | Schneider | |
| 6,981,023 | B1 * | 12/2005 | Hamilton et al. | 709/206 |
| 6,990,678 | B2 * | 1/2006 | Zigmond | 725/51 |
| 7,010,568 | B1 * | 3/2006 | Schneider et al. | 709/203 |
| 7,013,298 | B1 * | 3/2006 | De La Huerga | 707/3 |
| 7,039,708 | B1 * | 5/2006 | Knobl et al. | 709/227 |
| 7,043,436 | B1 * | 5/2006 | Ryu | 704/270.1 |
| 7,089,194 | B1 * | 8/2006 | Berstis et al. | 705/14.54 |
| 7,120,236 | B1 | 10/2006 | Schneider | |
| 7,136,725 | B1 | 11/2006 | Paciorek et al. | |
| 7,136,932 | B1 | 11/2006 | Schneider | |
| 7,188,138 | B1 | 3/2007 | Schneider | |
| 7,194,552 | B1 | 3/2007 | Schneider | |
| 7,565,402 | B2 | 7/2009 | Schneider | |
| 2002/0073233 | A1 | 6/2002 | Gross | |
| 2002/0129013 | A1 * | 9/2002 | Thomas | 707/3 |
| 2002/0188699 | A1 * | 12/2002 | Ullman et al. | 709/219 |
| 2003/0074672 | A1 * | 4/2003 | Daniels | 725/110 |
| 2004/0030759 | A1 * | 2/2004 | Hidary et al. | 709/218 |
| 2005/0055306 | A1 * | 3/2005 | Miller et al. | 705/37 |
| 2005/0235031 | A1 | 10/2005 | Schneider | |
| 2008/0005342 | A1 | 1/2008 | Schneider | |
| 2008/0010365 | A1 | 1/2008 | Schneider | |
| 2008/0016142 | A1 | 1/2008 | Schneider | |
| 2008/0016233 | A1 | 1/2008 | Schneider | |
| 2008/0059607 | A1 | 3/2008 | Schneider | |
| 2008/0235383 | A1 | 9/2008 | Schneider | |

FOREIGN PATENT DOCUMENTS

| | | |
|---|---|---|
| WO | WO9922488 | 5/1999 |
| WO | WO9939275 | 8/1999 |

OTHER PUBLICATIONS

Schneider, Eric; Claims from Pending U.S. Appl. No. 11/687,672.
Schneider, Eric; Claims from Pending U.S. Appl. No. 10/711,834.
Schneider, Eric; Claims from Pending U.S. Appl. No. 11/952,105.
Schneider, Eric; Claims from Pending U.S. Appl. No. 12/044,804.
Schneider, Eric; Claims from Pending U.S. Appl. No. 12/109,608.
NTIA-DOC, Request for Comments on the Enhancement of the .us Domain Space, Aug. 4, 1998, pp. 1-5, http//:www.ntia.doc.gov-ntiahome-domainname-usrfc-dotusrfc.htm.
Wired News Report, The Postal Proposal, Wired News, May 8, 1999, pp. 1-3, from http//:www.wired.com-news-technology-0,1282.131-30,00.html.
Wired News Report, Depp Space Web?, Wired News, Jul. 22, 1999, p. 1, from http//:www.wired.com/news/technology-0,1282,139-09,00.html.
Oakes, C., Internet Keywords Patent Spat, Wired News, Jul. 22, 1999, pp. 1-2, from http//:www.wired.com-news-technology-0,1282,13892.00html.

(56) References Cited

OTHER PUBLICATIONS

NTIA-DOC, Improvement of Technical Management of Internet Names and Addresses, Federal Register V63 N34, Feb. 20, 1998, pp. 1-17, from http//:www.ntia.doc.gov-ntiahome-domainname-022098fedreg.httm.

Crowe, R., Telephone Exchange Name Project, Web Site (1998), pp. 1-3, from http//:ourwebhome.com/TENP/TENproject.html.

Harrenstien, et al.; "RFC 954: Nicname/Whois," IETF, Oct. 1985, pp. 1-4, http//:ww.faqs.org/rfcs/rfc954.html.

Mockapetris P., "RFC 1035: Domain Names-Implementation and Specification", IETF, Nov. 1987, pp. 1-43, http//:www.faqs.org/rfcs/rfc1035.html.

Berners, Lee T.; "RFC 1630: Universal Resource Identifiers in WWW-A Unifying Syntax for the Expression of Names and Addresses of Objects on the Network as used in the World Wide Web," Jun. 1994; pp. 1-23; http://www.faqs.org/rfcs/rfc1630.html.

Statement of the Policy Oversight Committee, The Economic Structure of Internet Generic Top-Level Domain Name Registries Analysis and Recommendations, Jul. 23, 1998, pp. 1-8.

* cited by examiner

> From: question@tut.net
> To: info@example.com
> Subject: Request more Info.
> Date: Fri, 16 Oct 1998 13:19:12 EST
> Content-Type: text/plain
>
> I was writing to request more info. on the products listed at the example.com web site.
>
> Also there was mention of another web site called www.another.example
>
> I'm interested to know more about this site.
>
> If you'd like you can check out our website at king.tut.net
>
> Thank you.

The link-it message checker has detected 3 partial URL's that may need adjustments. Please check the appropriate boxes below if you would like to make links in your e-mail message.

| Anchor as a: | Domain Name | URL | FQDN | None |
|---|---|---|---|---|
| example.com | ☐ | ☐ | ☒ | ☐ |
| www.another.example | ☒ | ☐ | ☐ | ☐ |
| king.tut.net | ☐ | ☐ | ☐ | ☒ |

( OK )　　　( Cancel )

*Fig. 5b*

From: question@tut.net
To: info@example.com
Subject: Request more Info.
Date: Fri, 16 Oct 1998 13:19:12 EST
Content-Type: html/text
<HTML><BODY><BR>
I was writing to request more info. on the
products listed at the
<A HREF="http://www.example.com">
www.example.com</A> web site.<P>
Also there was mention of another
web site called
<A HREF="http:// example.another.com">
another.example</A><P>
I'm interested to know more about this site.
<P>
If you'd like you can check out our website at
<BR>king.tut.net<P>
Thank you.
</BODY></HTML>

*Fig. 5c*

REAL-TIME COMMUNICATION PROCESSING METHOD, PRODUCT, AND APPARATUS

CROSS REFERENCES TO RELATED APPLICATIONS

This application: is a continuation-in-part of, and claims priority to, U.S. patent application Ser. No. 09/532,500 filed Mar. 21, 2000, entitled "Fictitious domain name method, product, and apparatus," now U.S. Pat. No. 7,136,932, which claims the benefit of U.S. Provisional Application No. 60/143,859 filed Jul. 15, 1999, U.S. Provisional Application No. 60/135,751 filed May 25, 1999, and U.S. Provisional Application 60/125,531 filed Mar. 22, 1999; is a continuation-in part of, and claims priority to, U.S. patent application Ser. No. 09/525,350 filed Mar. 15, 2000, entitled "Method for integrating domain name registration with domain name resolution," now U.S. Pat. No. 6,338,082, which claims the benefit of U.S. Provisional Application 60/157,075 filed Oct. 1, 1999 and Provisional Application 60/130,136 filed Apr. 20, 1999; claims the benefit of U.S. Provisional Patent Application Ser. No. 60/160,125 filed Oct. 18, 1999; claims the benefit of U.S. Provisional Patent Application Ser. No. 60/153,594 filed Sep. 13, 1999; and claims the benefit of U.S. Provisional Patent Application Ser. No. 60/153,336 filed Sep. 10, 1999; which are all hereby incorporated by reference herein in their entirety.

FIELD OF THE INVENTION

This invention relates to identifier detection, and more specifically relates to a method, product, and apparatus for performing an operative function in response to detecting an identifier.

BACKGROUND OF THE INVENTION

The Internet is a vast computer network consisting of many smaller networks that span the world. A network provides a distributed communicating system of computers that are interconnected by various electronic communication links and computer software protocols. Because of the Internet's distributed and open network architecture, it is possible to transfer data from one computer to any other computer worldwide. In 1991, the World-Wide-Web (WWW or Web) revolutionized the way information is managed and distributed.

The Web is based on the concept of hypertext and a transfer method known as Hypertext Transfer Protocol (HTTP) which is designed to run primarily over a Transmission Control Protocol/Internet Protocol (TCP/IP) connection that employs a standard Internet setup. A server computer may issue the data and a client computer displays or processes it. TCP may then convert messages into streams of packets at the source, then reassemble them back into messages at the destination. Internet Protocol (IP) handles addressing, seeing to it that packets are routed across multiple nodes and even across multiple networks with multiple standards. HTTP protocol permits client systems connected to the Internet to access independent and geographically scattered server systems also connected to the Internet.

Client side browsers, such as Netscape Navigator and/or Microsoft Internet Explorer (MSIE) provide a graphical user interface (GUI) based client applications that implement the client side portion of the HTTP protocol. One format for information transfer is to create documents using Hypertext Markup Language (HTML). HTML pages are made up of standard text as well as formatting codes that indicate how the page should be displayed. The client side browser reads these codes in order to display the page. A web page may be static and requires no variables to display information or link to other predetermined web pages. A web page is dynamic when arguments are passed which are either hidden in the web page or entered from a client browser to supply the necessary inputs displayed on the web page. Common Gateway Interface (CGI) is a standard for running external programs from a web server. CGI specifies how to pass arguments to the executing program as part of the HTTP server request. Commonly, a CGI script may take the name and value arguments from an input form of a first web page which is be used as a query to access a database server and generate an HTML web page with customized data results as output that is passed back to the client browser for display.

The Web is a means of accessing information on the Internet that allows a user to "surf the web" and navigate the Internet resources intuitively, without technical knowledge. The Web dispenses with command-line utilities, which typically require a user to transmit sets of commands to communicate with an Internet server. Instead, the Web is made up of millions of interconnected web pages, or documents, which may be displayed on a computer monitor. Hosts running special servers provide the Web pages. Software that runs these Web servers is relatively simple and is available on a wide range of computer platforms including PC's. Equally available is a form of client software, known as a Web browser, which is used to display Web pages as well as traditional non-Web files on the client system.

A network resource identifier such as a Uniform Resource Identifier (URI) is a compact string of characters for identifying an abstract or physical resource. URIs are the generic set of all names and addresses that refer to objects on the Internet. URIs that refer to objects accessed with existing protocols are known as Uniform Resource Locators (URLs). A URL is the address of a file accessible on the Internet. The URL contains the name of the protocol required to access the resource, a domain name, or IP address that identifies a specific computer on the Internet, and a hierarchical description of a file location on the computer. For example the URL "http://www.example.com/index.html", where "http" is the scheme or protocol, "www.example.com" is the Fully Qualified Domain Name (FQDN), and "index.html" is the filename located on the server.

Because an Internet address is a relatively long string of numbers (e.g., 31.41.59.26) that is difficult to remember, Internet users rely on domain names, memorable and sometimes catchy words corresponding to these numbers, in order to use electronic mail (e-mail) and to connect to Internet sites on the Web. The Domain Name System (DNS) is a set of protocols and services on a network that allows users to utilize domain names when looking for other hosts (e.g., computers) on the network. The DNS is composed of a distributed database of names. The names in the DNS database establish a logical tree structure called the domain name space. Each node or domain in the domain name space is named and may contain subdomains. Domains and subdomains are grouped into zones to allow for distributed administration of the name space.

A domain name consists of two parts: a host and a domain. Technically, the letters to the right of the "dot" (e.g., tut.net) are referred to as Top Level Domains (TLDs), while hosts, computers with assigned IP addresses that are listed in specific TLD registries are known as second-level domains (SLDs). For the domain name "tut.net", ".net" is the TLD, and "tut" is the SLD. Domain name space is the ordered hierarchical set of all possible domain names either in use or to be used for locating an IP address on the Internet. TLDs are known as top-level domains because they comprise the highest-order name space available on the Internet. Second-level domains, as well as third-level domains (3LDs) such as "king-.tut.net", are subsidiary to TLDs in the hierarchy of the Internet's DNS.

There are two types of top-level domains, generic and country code. Generic top-level domains (gTLDs) were created to allocate resources to the growing community of institutional networks, while country code top-level domains (ccTLDs) were created for use by each individual country, as deemed necessary. More than 240 national, or country-code TLDs (e.g., United States (.us), Japan (.jp), Germany (.de), etc.) are administered by their corresponding governments, or by private entities with the appropriate national government's acquiescence. A small set of gTLDs does not carry any national identifier, but denote the intended function of that portion of the domain space. For example, ".com" was established for commercial networks, ".org" for not-for-profit organizations, and ".net" for network gateways. The set of gTLDs was established early in the history of the DNS and has not been changed or augmented in recent years (COM, ORG, GOV, and MIL were created by January 1985, NET in July 1985, and INT was added in November 1988).

URLs are used in media and written in documents or typed within e-mail, and data files, etc. as a means to make reference to accessible online content that helps express the context of the ideas one wishes to communicate. URLs are generally written in an abbreviated manner as partial URLs or domain names (e.g., "http://www.example.com" is the URL, "www.example.com" is the FQDN, and "example.com" is the domain name). During the early stages of commercialization on the Internet, businesses displayed the full URL when advertising a commercial or display ad as a means to locate the resources of the business on the Internet. Improvements have been made to recognize partial URLs when entered in the location field of a web browser or network accessible device for automatically appending protocol information so a full URL request can be made. By submitting a domain name or FQDN in the location field, the browser modifies the request by adjusting the partial URL and adding "http://" in front of the domain name or FQDN in order to construct a valid URL. As a result of this convenience, companies have modified their advertising and distribution of URLs through print, film, radio, television and other media as "example.com" or "www.example.com" instead of the URL "http://www.example.com". Though a helpful mnemonic for consumers to more readily identify and access the location and origin of goods and services on a public network such as the Internet, the mnemonic is only applicable when using a command line of a device or location field of a web browser program as a means to access the advertised web site.

There is a need for such a method or device to assure that identifiers such as partial URLs (e.g., domain names and FQDNs) may be translated back to a full URL or web address so that the continuity for hyperlinking across separate mediums is realized. Furthermore, there is a need to extend the use of an identifier by performing an operative function upon detection of such identifiers across different media.

SUMMARY OF THE INVENTION

Briefly, this invention relates to detecting indicia and generating hyperlink references or performing an operative function in response to such detected indicia. The present invention enables hyperlink references to be generated upon detection of domain names or fictitious indicia. The invention allows a user to create a hyperlink reference by only supplying a domain name having a TLD or TLDA as input. The present invention enables the user to "surf the web" for material related to a current broadcast based on generating hyperlinks from closed caption or other decoded text. The invention allows for partial URLs to be used in documents and other sources aside from the location field of the browser with the ability to hyperlink from such abbreviated reference. The present invention enables a user to automatically dial the telephone or update a phone book in response to a radio or television broadcast. The invention provides notification if a user won a lottery. The present invention also provides notification when a user might want to buy or sell a stock. Other objects and advantages will be appreciated by those skilled in the art from the following teachings of the present invention.

In general, in accordance with the present invention a method for processing a signal having audio includes the steps of determining whether the signal includes encoded text, processing the encoded text in response to determining that the signal does include encoded text, storing a portion of the audio signal in a sound cache in response to determining that the signal does not include encoded text, determining whether an identifier can be recognized from any portion of the sound cache, and performing an operative function corresponding to the identifier in response to determining that the identifier can be recognized, from the sound cache.

Identifier detection may further include the step of determining whether any portion of the sound cache resembles any portion of a sound table having stored sounds, wherein the stored sounds resemble at least one identifier. The step of determining whether to process a remaining portion of the audio signal may also be included. Encoded text may be processed by decoding a portion of the encoded text, determining whether the decoded text includes any identifiers, and performing an operative function corresponding to the identifier in response to determining that the decoded text does include the identifier.

When an identifier is a phone number the corresponding operative function may further include the step of selecting from one of a speed dial, auto dial, phone book, generating a hyperlink to dial said phone number, and dialing said phone number. When an identifier is an e-mail address the corresponding operative function may further include the step of selecting from one of an address book and an e-mail message composition window designated to send to said e-mail address. When an identifier is a lottery number the corresponding operative function may further include the step of comparing the lottery number to a table of preselected lottery numbers. When an identifier is a stock symbol the corresponding operative function may further include the step of providing a stock update from the stock symbol. When an identifier is a zip code the corresponding operative function may further include the step of selecting from one of an address book and decoding a postal address from the cache preceding the identifier. When an identifier includes a HLD (e.g., VDN, FDN) the corresponding operative function may further include the step of selecting from one of a bookmarking the domain name and generating an accessible hyperlink from the domain name.

In accordance with another aspect of the present invention, a method for generating hyperlinks from a first data file includes the steps of detecting any unlinked portions of text having a HLD from the first data file, selecting which the unlinked portions of text are to be modified, generating a hyperlink for each selected unlinked portion, and generating a second file that includes the first data file having the hyperlinks in place of the selected unlinked portions of text. The unlinked portions of text may be modified by selecting a label for each selected unlinked portion. Each hyperlink may include the selected label for each selected unlinked portion.

In accordance with yet additional aspects of the present invention, an apparatus which implements substantially the same functionality in substantially the same manner as the methods described above is provided.

In accordance with other additional aspects of the present invention, a computer-readable medium that includes computer-executable instructions may be used to perform substantially the same methods as those described above is provided.

The foregoing and other features of the invention are hereinafter fully described and particularly pointed out in the claims. The following description and the annexed drawings set forth in detail one or more illustrative aspects of the invention, such being indicative, however, of but one or a few of the various ways in which the principles of the invention may be employed.

BRIEF DESCRIPTION OF THE DRAWINGS

FIG. 5a depicts an e-mail message used as an input source file in accordance with the present invention.

FIG. 5b is an illustration of the user interface for displaying candidate links for conversion from the input source file in accordance with the present invention.

FIG. 5c depicts a modified e-mail message that is an output file generated from combining the user interface with the input source file in accordance with the present invention.

DETAILED DESCRIPTION OF THE INVENTION

Figure 1A:
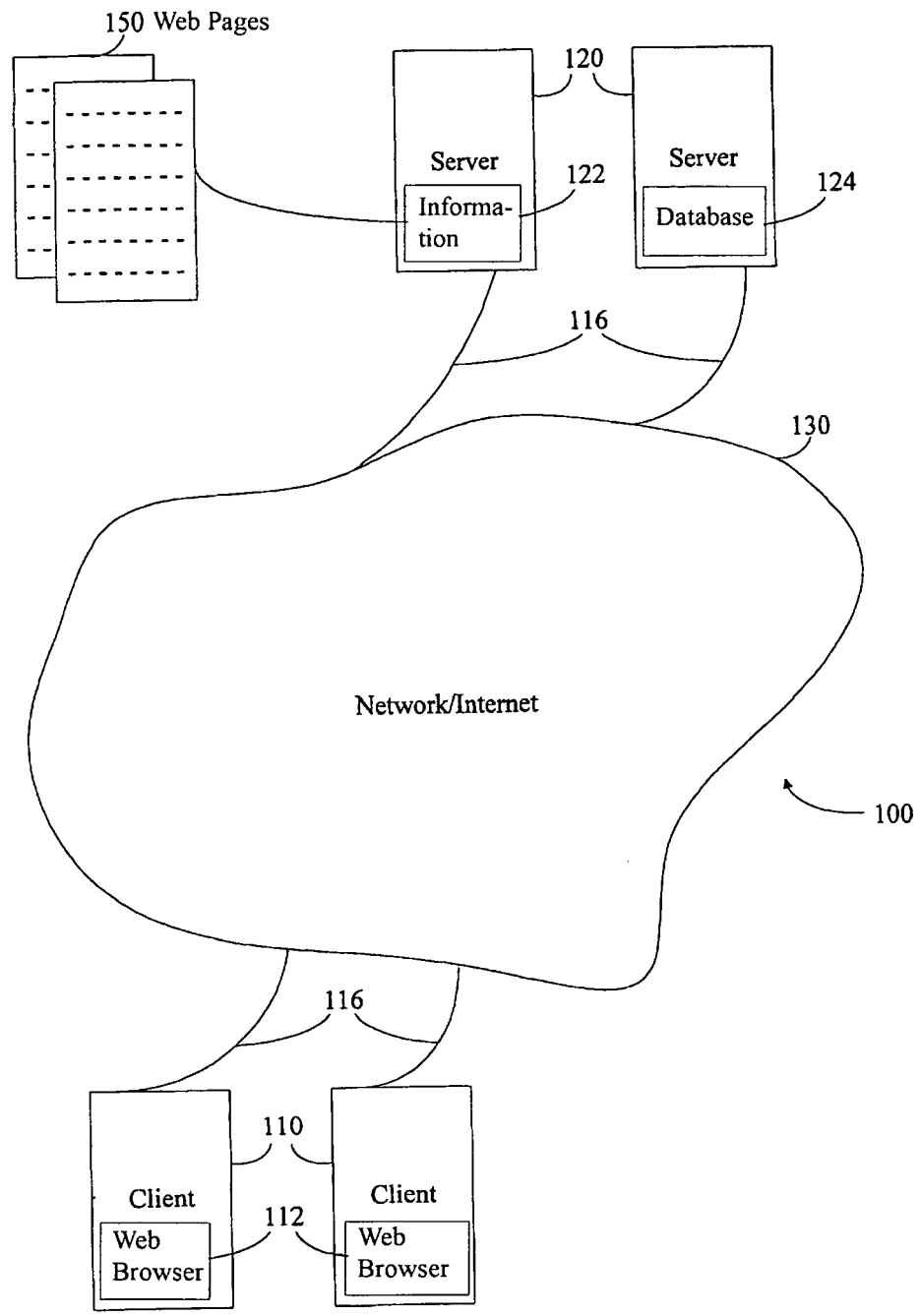
FIG. 1a is a block diagram of an exemplary distributed computer system in accordance with the present invention.

The present invention will now be described with reference to the drawings, wherein like reference numerals are used to refer to like elements throughout.

FIG. 1a illustrates an exemplary system for providing a distributed computer system 100 in accordance with one aspect of the present invention and includes client computers or any network access apparatus 110 connected to server computers 120 via a network 130. The network 130 may use Internet communications protocols (IP) to allow the clients 110 to communicate with the servers 120. The communication device of a network access apparatus 110 may include a transceiver, a modem, a network interface card, or other interface devices to communicate with the electronic network 130. The network access apparatus 110 may be operatively coupled to and/or include a Global Positioning System (GPS). The modem may communicate with the electronic network 130 via a line 116 such as a telephone line, an ISDN line, a coaxial line, a cable television line, a fiber optic line, or a computer network line. Alternatively, the modem may wirelessly communicate with the electronic network 130. The electronic network 130 may provide an on-line service, an Internet service provider, a local area network service, a wide area network service, a cable television service, a wireless data service, an intranet, a satellite service, or the like.

The client computers 110 may be any network access apparatus including hand held devices, palmtop computers, personal digital assistants (PDAs), notebook, laptop, portable computers, desktop PCs, workstations, and/or larger/smaller computer systems. It is noted that the network access apparatus 110 may have a variety of forms, including but not limited to, a general purpose computer, a network computer, an internet television, a set top box, a web-enabled telephone, an internet appliance, a portable wireless device, a game player, a video recorder, and/or an audio component, for example.

Each client 110 typically includes one or more processors 166, memories 168, and input/output devices 170. An input device may be any suitable device for the user to give input to client computer system 110, for example: a keyboard, a 10-key pad, a telephone key pad, a light pen or any pen pointing device, a touchscreen, a button, a dial, a joystick, a steering wheel, a foot pedal, a mouse, a trackball, an optical or magnetic recognition unit such as a bar code or magnetic swipe reader, a voice or speech recognition unit, a remote control attached via cable or wireless link to a game set, television, and/or cable box. A data glove, an eye-tracking device, or any MIDI device may also be used. A display device may be any suitable output device, such as a display screen, text-to-speech converter, printer, plotter, fax, television set, or audio player. Although the input device is typically separate from the display device, they may be combined; for example: a display with an integrated touchscreen, a display with an integrated keyboard, or a speech-recognition unit combined with a text-to-speech converter.

The servers 120 may be similarly configured. However, in many instances server sites 120 include many computers, perhaps connected by a separate private network. In fact, the network 130 may include hundreds of thousands of individual networks of computers. Although client computers 110 are shown separate from the server computers 120, it is understood that a single computer might perform the client and server roles. Those skilled in the art will appreciate that the computer environment 100 shown in FIG. 1a is intended to be merely illustrative. The present invention may also be practiced in other computing environments. For example, the present invention may be practiced in multiple processor environments wherein the client computer includes multiple processors. Moreover, the client computer need not include all of the input/output devices as discussed above and may also include additional devices. Those skilled in the art will appreciate that the present invention may also be practiced via Intranets and more generally in distributed environments in which a client computer requests resources from a server computer.

During operation of the distributed system 100, users of the clients 110 may desire to access information records 122 stored by the servers 120 while utilizing, for example, the Web. Furthermore, such server systems 120 may also include one or more search engines having one or more databases 124. The records of information 122 may be in the form of Web pages 150. The pages 150 may be data records including as content plain textual information, or more complex digitally encoded multimedia content, such as software programs, graphics, audio signals, videos, and so forth. It should be understood that although this description focuses on locating information on the World-Wide-Web, the system may also be used for locating information via other wide or local area networks (WANs and LANs), or information stored in a single computer using other communications protocols.

The clients 110 may execute Web browser programs 112, such as Netscape Navigator or MSIE to locate the pages or records 150. The browser programs 112 enable users to enter addresses of specific Web pages 150 to be retrieved. Typically, the address of a Web page is specified as a URI or more specifically as a URL. In addition, when a page has been retrieved, the browser programs 112 may provide access to other pages or records by "clicking" on hyperlinks (or links) to previously retrieved Web pages. Such links may provide an automated way to enter the URL of another page, and to retrieve that page.

Figure 1B:
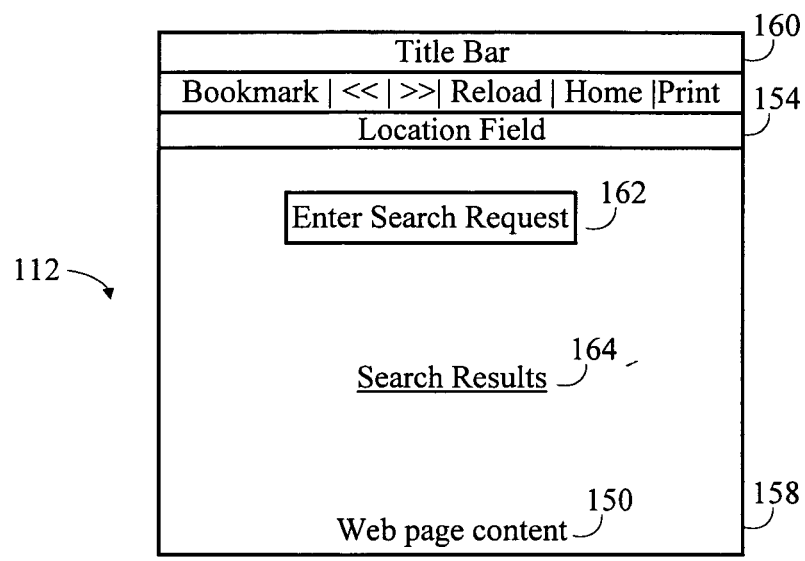
FIG. 1b is a diagram depicting the location field or web page search request used in a conventional web browser.

FIG. 1b more specifically illustrates an exemplary selection of common operative components of a web browser program 112. The web browser 112 enables a user to access a particular web page 150 by typing the URL for the web page 150 in the location field 154. The web page 150 contents corresponding to the URI from the location field 154 may be displayed within the client area of the web browser display window 158, for example. Title information from the web page 150 may be displayed in the title bar 160 of the web browser 112. The web page 150 contents may further include a user interface element such as that of an input text box 162 for inputting search requests and, in turn, search results having identifiers 164 such as a hyperlink or URI.

Figure 1C:
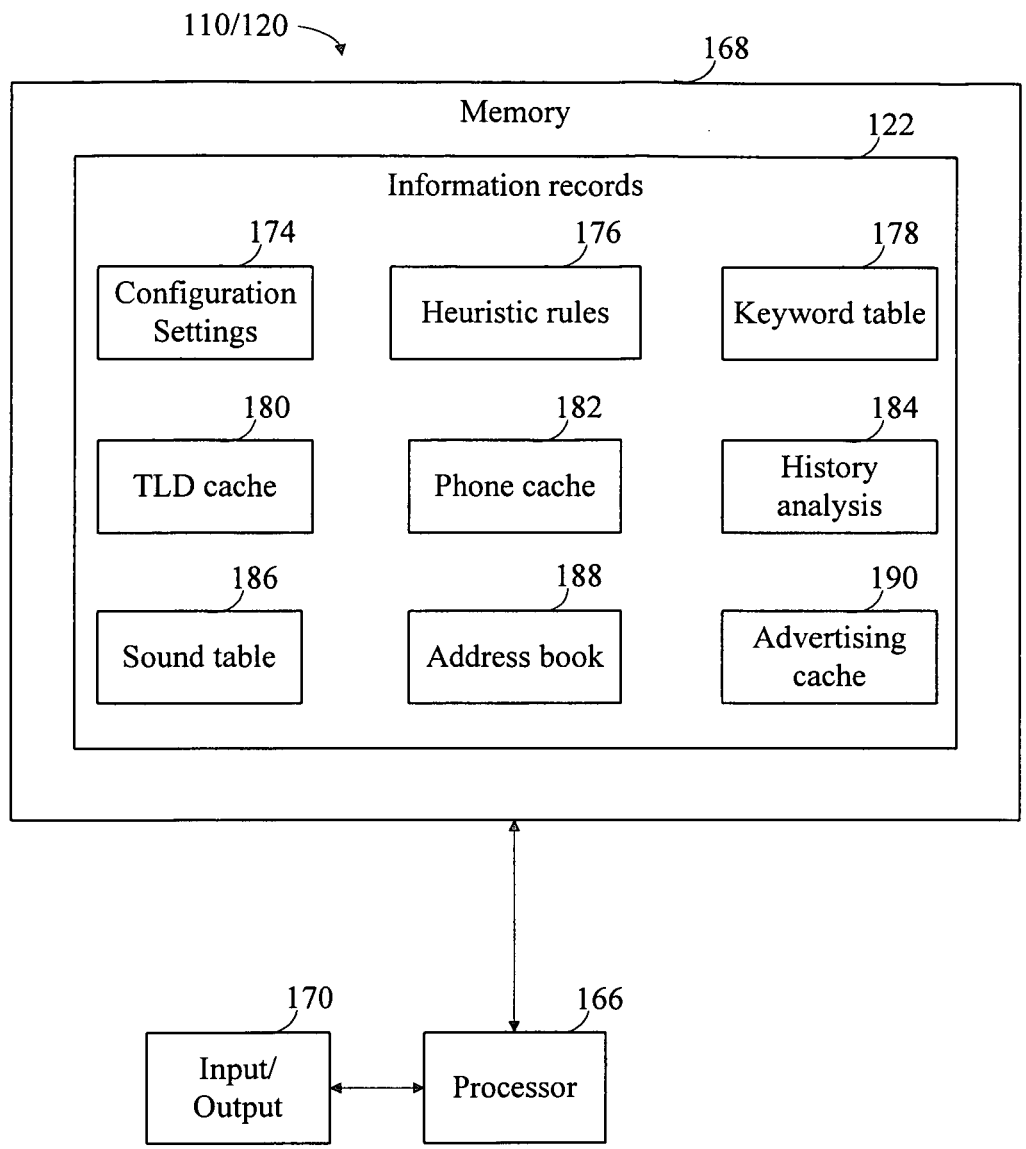
FIG. 1c is a block diagram illustrating exemplary information records stored in memory in accordance with the present invention.

FIG. 1c illustrates a block diagram of a storage device such as memory 168 in operative association with a processor 166. The processor 166 is operatively coupled to input/output devices 170 in a client 110 and/or server 120 computing system. Stored in memory 168 may be information records 122 having any combination of exemplary content such as lists, files, and databases. Such records may include for example: user modifiable configuration settings 174, heuristic rules 176, Keyword table 178, TLD cache 180, phone cache 182, history analysis 184, sound table 186, address book 188, and advertising cache 190. These information records may be further introduced and discussed in more detail throughout the disclosure of this invention.

Figure 2:
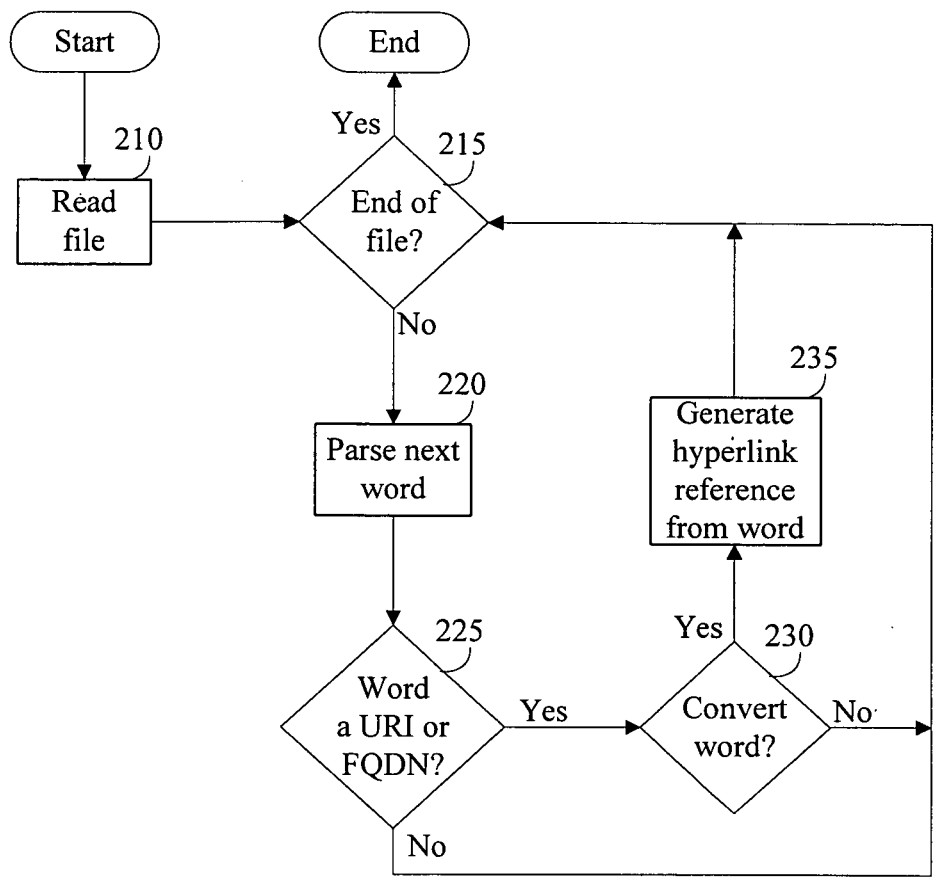
FIG. 2 is a flowchart illustrating the steps performed by a prior art system for generating hyperlink references.

FIG. 2 is a flowchart illustrating the steps performed by a prior art system for generating hyperlink references. A device such as a network access apparatus 110, servlet, applet, stand-alone executable program, a command line, or user interface element such as a text box object or location field 154 of a web browser 112, receives and parses input such as text or voice in step 210. An input file may be read from memory 168 and it may be determined in step 215 whether an end of file (EOF) marker is read. Upon EOF, the script or program completes execution. While an EOF has not been detected, words may be parsed from the input file in step 220. For each word, it may be determined in step 225 whether the word is a URI or FQDN. When it is determined that the word is not a URI or FQDN then steps may be repeated (215, 220, 225) until an EOF is reached or the word is a URI or FQDN. When it is determined that the word is a URI or FQDN then it may be determined in step 230 whether the word is to be converted. If the word is not converted then steps are repeated (215, 220, 225) until an EOF is reached or the word is a URI or FQDN. If the word is to be converted then a hyperlink reference is generated from the word and then steps are repeated (215, 220, 225) until an EOF is reached or the word is a URI or FQDN.

In accordance with methods known to one of ordinary skill in the art, the detection of whether a word is a URI or FQDN is performed by determining whether the word includes a prefix such as a scheme/protocol or common host server name (e.g., "http", "ftp", "telnet", "www", etc.). This method is particularly applicable in the field of word processing, spell checking, and identifier detection. For instance, it is common for an e-mail composition program to markup a URI or FQDN on the fly, but neglect to markup a domain name on the fly or by prompting the user. In another example, it is explained in U.S. Provisional Application Ser. No. 60/160,125 filed Oct. 18, 1999, by Schneider, entitled "Method and system for integrating resource location, search services, and registration services" that no provisions have been made to detect the presence of a domain name before processing a search request. Any results that are returned from a search request are based on finding a database match to the domain name as a keyword or literal string.

In a hierarchical naming system such as the DNS, a first domain represents the highest level domain (HLD). A HLD that is determined not resolvable is referred to as a Top Level Domain Alias (TLDA). A resolvable HLD is referred to as a Top Level Domain (TLD). Specific methods for applying TLDAs are explained in U.S. patent application Ser. No. 09/532,500 filed Mar. 21, 2000, by Schneider, entitled "Fictitious domain name method, product, and apparatus" and U.S. Provisional Application Ser. No. 60/153,336 filed Sep. 10, 1999, by Schneider entitled "Method and apparatus for generating hyperlink references and/or performing an operative function in response to detected indicia."

Figure 3:
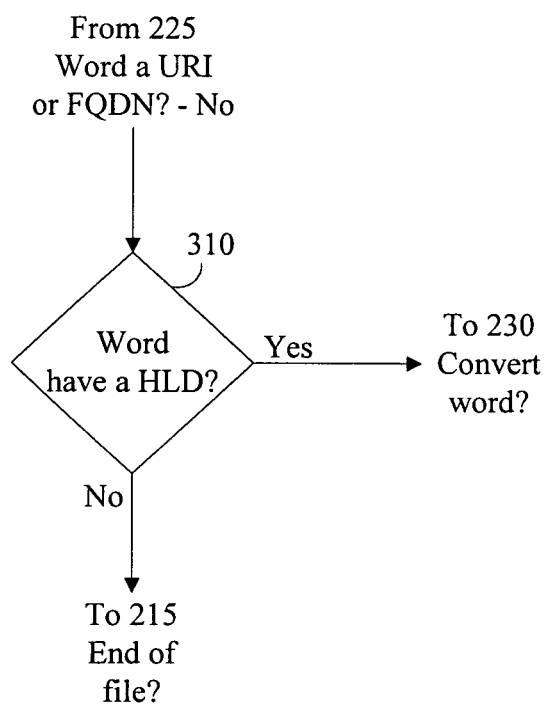
FIG. 3 is a flowchart illustrating the steps performed for generating hyperlinks based on detecting a highest level domain (HLD) in accordance with the present invention.

FIG. 3 is a flowchart illustrating a step performed for improving how hyperlink references may be generated. When it is determined in step 225 that the word is not a URI or FQDN it is then further determined in step 310 whether the word includes a HLD. When it is determined in step 310 that the word does not have a HLD then steps may be repeated (215, 220, 225) until an EOF is reached, or the word is either a URI or FQDN (step 225), or includes a HLD (step 310). When it is determined that the word includes a HLD then it may be determined in step 230 whether the word is to be converted as discussed in FIG. 2. The detection of whether a word includes a HLD is performed by determining whether the word includes a suffix (rather than a prefix as discussed above) such as ".com", ".cc", etc. Detection may be performed by comparing the word to a table of resolvable TLDs 180.

Figure 4:
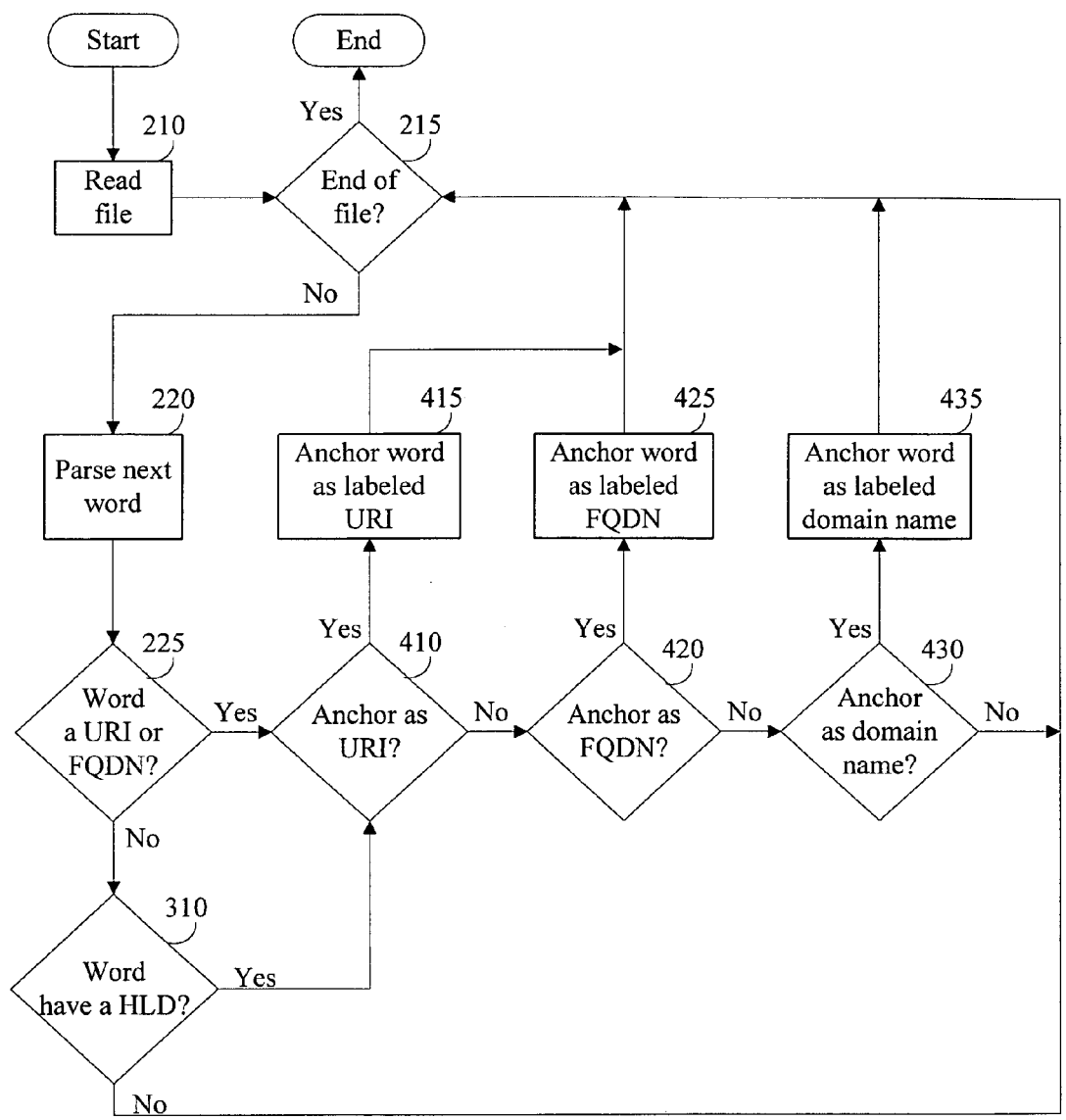
FIG. 4 is a flowchart illustrating the steps performed for hyperlink generation in accordance with the present invention.

FIG. 4 illustrates how yet further improvements may be made when generating hyperlink references. A device such as a network access apparatus 110, servlet, applet, stand-alone executable program, a command line, or user interface element such as a text box object or location field 154 of a web browser 112, receives and parses input such as text or voice in step 210. An input file may be read from storage and it may be determined in step 215 whether an end of file (EOF) marker is read. Upon EOF, the script or program completes execution. While an EOF has not been detected, words may be parsed from the input file in step 220. For each word, it may be determined in step 225 whether the word is a URI or FQDN or whether the word includes a HLD (step 310).

When it is determined that the word is not a URI or FQDN it may then be further determined in step 310 whether the word includes a HLD. When it is determined in step 310 that the word does not have a HLD then steps may be repeated (215, 220, 225) until an EOF is reached or the word is either a URI or FQDN or includes a HLD. When it is determined (225, 310) that either the word is a URI or FQDN or that the word includes a HLD, then it may be determined what label is used to generate an anchored hyperlink reference. If it is determined in step 410 that a URI label is used to generate the anchored hyperlink reference then an anchored hyperlink reference with a URI label may be generated in step 415 from the word. If not, and it is determined in step 420 that a FQDN label is used to generate the anchored hyperlink reference then an anchored hyperlink reference with a FQDN label may be generated in step 425 from the word. If not, and it is determined in step 430 that a domain name label is used to generate the anchored hyperlink reference then an anchored hyperlink reference with a domain name label may be generated in step 435 from the word. If the word is not converted then steps may be repeated (215, 220, 225) until an EOF is reached or the word is either a URI or FQDN or includes a HLD.

The methods discussed above may apply to any text file or document from web pages, e-mail, newsgroups, and to any data file that represents information that may be applicable for applying hyperlinks to such data file. Any standalone application including a program, servlet, or applet and any function, macro, or script including VB Script, JavaScript, or PERL script to name a few may be executed by any computing device to provide an output file in response to a given input file or batch of files. The drawings of FIGS. 5a, 5b, 5c illustrate how such a program may be particularly used to process such an input file. Methods for applying automated markup of web pages for the purpose of web publishing are explained in U.S. patent application Ser. No. 09/532,500 filed Mar. 21, 2000, by Schneider, entitled "Fictitious domain name method, product, and apparatus" and U.S. Provisional Application Ser. No. 60/153,336 filed Sep. 10, 1999, by Schneider entitled "Method and apparatus for generating hyperlink references and/or performing an operative function in response to detected indicia."

FIG. 5a depicts the typical source code of a composed e-mail message. Within the message are partial URLs that have a HLD. When the steps of FIG. 4 are applied by reading the e-mail source file, the program extracts all words that are candidate for conversion and displays an interface as illustrated in FIG. 5b with options to select how the partial URLs or certain select words within the e-mail source are to be marked up. After selections are made and submitted by the user, steps for anchoring labels as shown in FIG. 4 are applied to generate a new e-mail source file with the partial URLs marked up according to the user's selection. The new e-mail source file may be reviewed in more detail in FIG. 5c to observe the correspondence between the user interface of FIG. 5b and the input source file of FIG. 5a. Modifications may be made to the script to automatically markup the partial URLs without displaying the user interface of FIG. 5b.

Another aspect of the present invention detects and/or generates identifiers in real time from input sources such as instant messaging, chat rooms, web conferencing, interactive television, any television broadcast, cable, satellite, video tape, DVD, and other sources that have a digital, analog or digital/analog signal where text may be decoded from. There are a variety of systems available for multiplexing and transmitting character and graphic information during the vertical retrace line period of video signals, such as television signals. This type of system includes, for instance, the character information broadcasting system in Japan; the world standard teletext (WST); the extended version of the United Kingdom teletext system; the closed caption system of the U.S.A., etc.

Video data frequently includes data, such as closed caption text data, that is transmitted during the vertical-blanking interval (VBI). The closed caption text data is typically transmitted during line 21 of either the odd or even field of the video frame in a National Television Standards Committee (NTSC) format. Closed caption decoders strip the text data from the video signal, decode the text data, and reformat the data for display, concurrent with the video data, on a television screen. Such closed caption decoders process the text data separately from a video signal. The closed caption data is displayed substantially in real time.

The associated data encoded in the vertical blanking period of the NTSC signal comprises digital data. The digital data may include ASCII text, any alpha numeric coding, or graphical information. Because the digital data is encoded in the vertical blanking period, the audio/video content in the NTSC signal is not disturbed. The associated data may comprise a wide variety of information pertaining to the audio/video content, such as news headlines, programming details, captioning for the associated audio/video, classified advertisements, and weather.

In a conventional TV set, teletext information is decoded from the broadcast video signal with the use of dedicated hardware that processes the data and displays it on the TV screen. In a teletext capable PC, this same dedicated teletext hardware is used to extract and process the teletext information from the video stream and then store it until the processed teletext information is sent to the host computer. The host computer then runs a software application that receives the processed data and formats it for display on the computer screen.

Currently, many PC-TV products allow a user to view TV on a computer monitor. Some products allow information to be viewed with the addition of appropriate hardware, typically a module that plugs into the TV card. Typically, a TV tuner receives a signal from either an antenna or cable connection. The selected channel is output from the tuner to the TV decoder chip and to the teletext decoder chip.

Advancements have been made to enable decoding to extend beyond that of a dedicated chip or processor to include software drivers to perform this task. A client application running on PC calls closed caption decoder driver in order to enable and disable the displaying of closed caption data. All application calls are made to closed caption capture layer (CCC) by client application. Capture layer extracts the Line 21 data from video processor hardware using hardware driver and notifies decoding layer that there is data available to process. Decoding layer then processes the data retrieved by capture layer and displays the closed caption text on the monitor in a window specified by client application.

Figure 6:
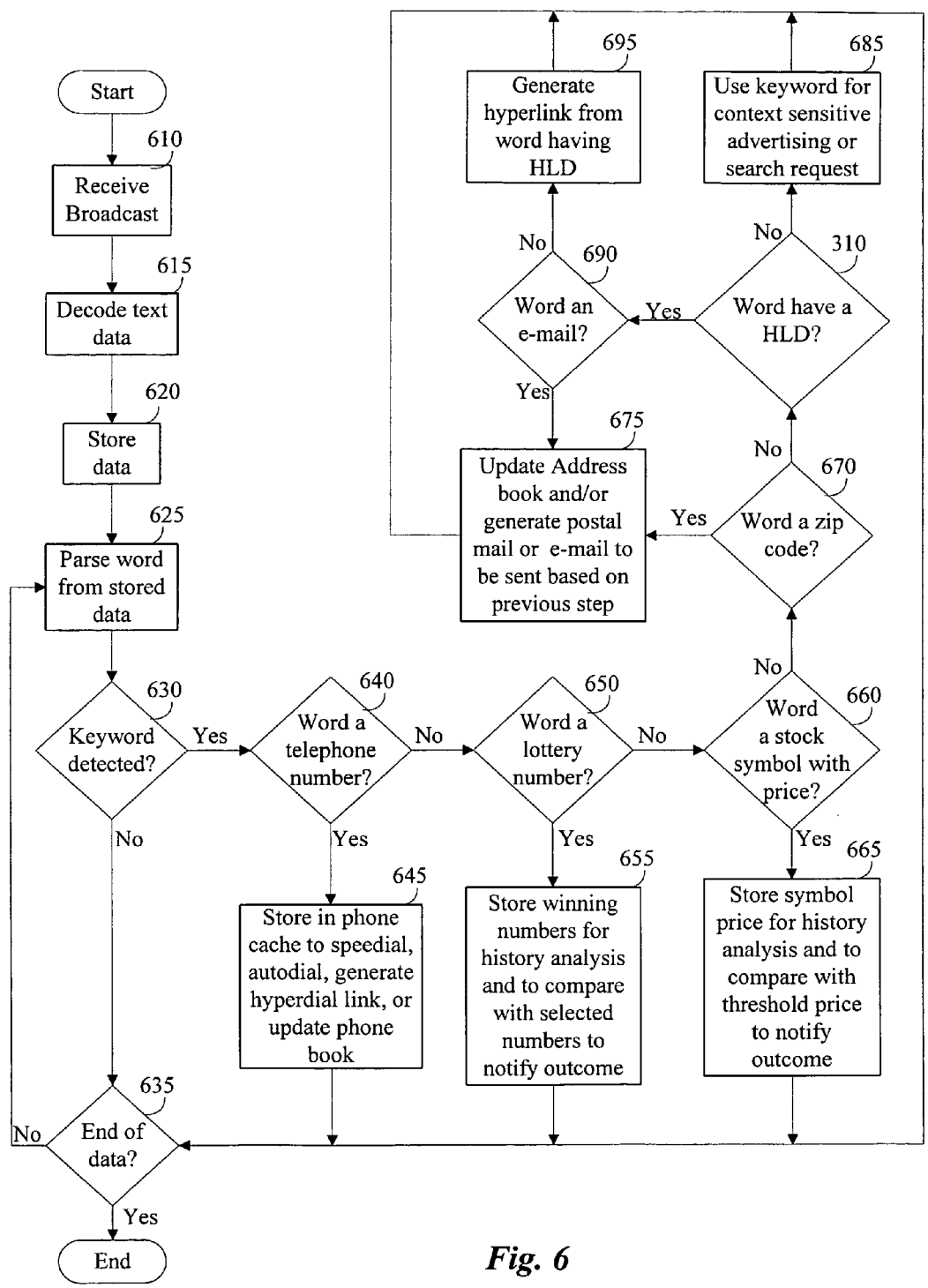
FIG. 6 is a flowchart illustrating the steps performed for decoding text from a broadcast to perform an operative function in accordance with the present invention.

FIG. 6 illustrates the steps for performing functions based on decoding text data from a broadcast. A device receives in step 610 a broadcast and decodes in step 615 text data from the broadcast signal. Data is stored in step 620 and words are parsed in step 625 from the stored data. The words are matched against rules 176 or a table of keywords 178 to determine in step 630 whether an identifier has been detected. If not, and it is determined in step 635 that there is more data, then the next word is parsed in step 625 from the stored data. If a keyword or the like has been detected in step 630 then it may be determined in step 640 whether the word is a phone number. When the word is a phone number, the number may be stored in a phone cache 182 in step 645 to speed-dial, autodial, generate a hyperdial link, or update a phone book. If the word is not a phone number then it may be determined in step 650 whether the word is a lottery number. When the word is a lottery number, the winning numbers are stored for history analysis 184 and compared in step 655 with selected lottery numbers to notify the outcome of the lottery. If the word is not a lottery number, then it may be determined in step 660 whether the word is a stock symbol having a price. When the word is a stock symbol having a price, the stock symbol and price are stored for history analysis 184 and compared in step 665 with a threshold price to alert a user by providing notification of when a stock price has exceeded a min/max threshold. If the word is not a stock symbol with a price then it may be determined in step 670 whether the word is a zip code. When the word is a zip code, a postal address is extracted from the decoded text to update in step 675 an address book 188 and/or generate postal mail.

If the word is not a zip code then it may be determined in step 310 whether the word includes a HLD. When the word includes a HLD, it may further be determined in step 690 whether the word is an e-mail address. If the word is an e-mail address then an address book may be updated in step 675 and/or an e-mail composition is displayed to respond to the identifier/keyword from the decoded text in step 615. If the word is not an e-mail then the word having the HLD may be processed in step 695 at a minimum as a domain name. In either case, a hyperlink may be generated from the word having the HLD. When it is determined that the word does not have a HLD, then the word may be processed in step 685 as a generalized keyword for categorization, advertisements, or as a search request. Advertisements may be selected accordingly from the advertising cache 190, as further explained in U.S. Provisional Application Ser. No. 60/153,594 filed Sep. 13, 1999, by Schneider entitled "Method and apparatus for using a portion of a URI to select and display advertising." After the word is processed by any of the above conditions the next word may be parsed in step 625 until it is determined in step 635 that there is no more data at which point the current application is saved and execution is completed.

The client application that processes the decoded text may further be programmed to detect additional identifiers including weather, alerts, warnings, time, news, header information of program segments or commercials, etc. Some keywords in the table 178 may include text such as but not limited to "1-800", "1-888", "1-877", a list of stock symbols, the "." delimiter or "www" to identify a possible domain name, a list of resolvable TLDs, the "@" delimiter to identify a possible e-mail address, zip codes, area codes, protocols such as "http", "ftp", etc. In addition, the time period of expected decoded data may be listed as well. For instance, it may be known that the lottery is announced 7:30 pm everyday on a specific broadcast. Keywords to anticipate the numbers, including the redundancy of announcing the numbers are combined as part of the detection mechanism of the client application. Also included in the client application may be routines to convert the mnemonic of a telephone number into digits for the purpose of storage and dialing. For example, decoded text from a broadcast yields "1-800-CALL-NOW" which is detected as indicia by the software and then further converted for storage in a phone book as "1-800-225-5669". A table of stored sounds 186 similar to the table of keywords listed above may be used in another aspect of the present invention (see FIG. 7.)

Further applications may include responding to such decoded text by determining keywords or categories to select ads for display. For example, in an interactive television application, text may be decoded from the closed caption data of a digital broadcast and keywords are extracted to retrieve ads, coupons, or rebates that may be concurrently displayed in the letterbox of the original broadcast. There are numerous variations that may be practiced by those skilled in the are by displaying advertising in response to a closed caption or teletext signal of a broadcast from which the subscriber or user can benefit from.

Other input sources without encoded text such as telephone, internet telephone, radio, web radio, or live audio broadcasts may be taken advantage of by yet another aspect of the present invention, which converts speech to text and detects identifiers and markup partial URLs in real time. The generation of hyperlinks for the purposes of performing operative functions such as dialing a phone number, composing an e-mail message, or connecting to a network address to name a few are discussed in more detail.

Figure 7:
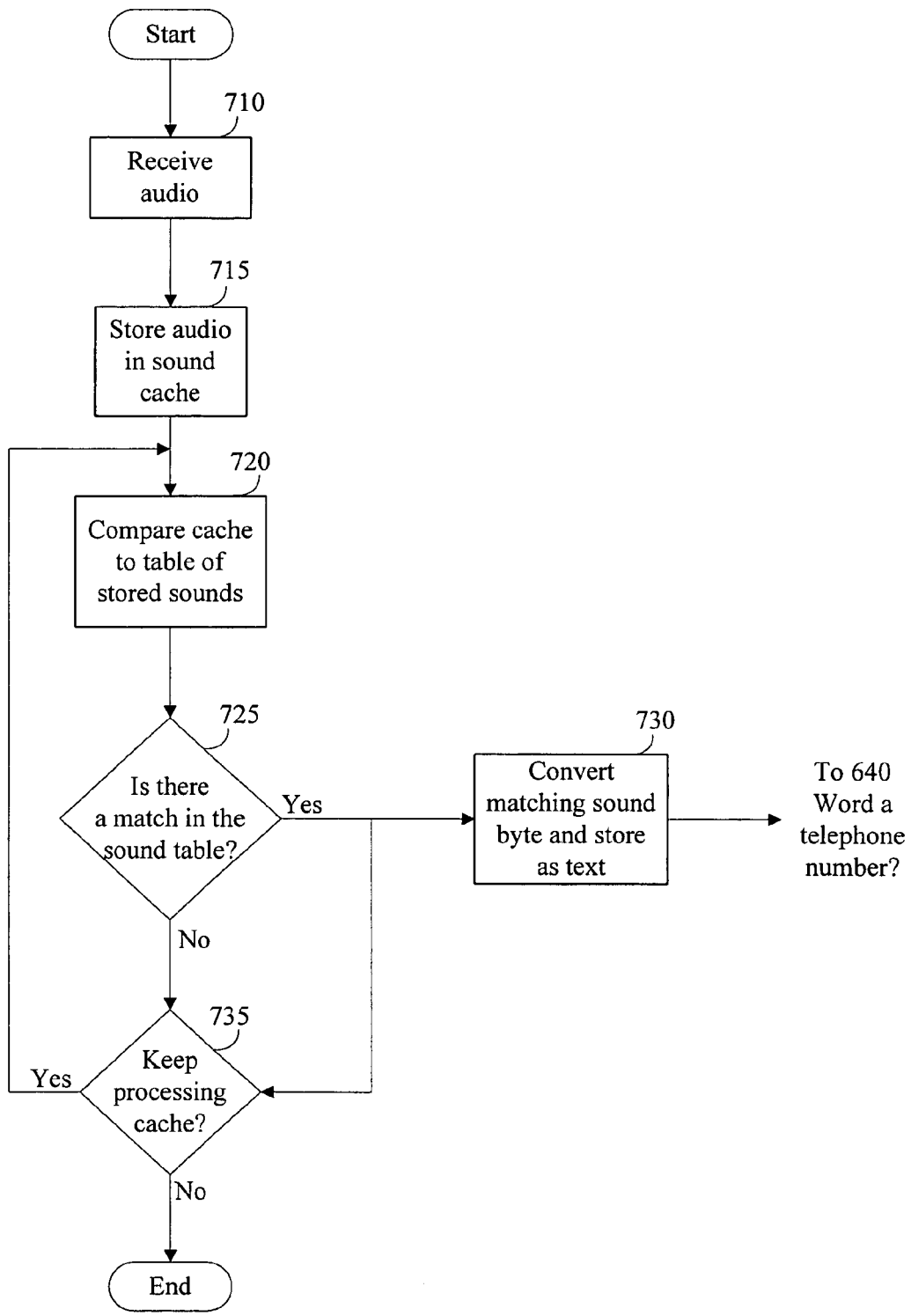
FIG. 7 is a flowchart illustrating the steps performed for converting speech to text in real time to perform an operative function in accordance with the present invention.

FIG. 7 illustrates the steps performed for performing an operative function in response to detecting an identifier from an audio source. When audio is received in step 710, a device or network access apparatus 110 may store the received audio in a sound cache in step 715. While storing audio, the stored audio may be compared in step 720 by consulting a table of stored sounds 186 and/or a set of heuristic rules 176 (e.g., a specified time frame to expect stored sounds). If there is at least a fuzzy and/or phonetic waveform match in step 725 (e.g., suitably duplicates, resembles, matches, or is otherwise correlated with a stored sound, voice recognition, speech recognition, etc.) between a portion of the stored audio and the sound table 186, a sound byte may be generated from the sound cache and converted in step 730 to text by a speech-to-text or voice recognition decoder for further analysis. While the sound byte is converted to text (step 730) or when there is no recognition match (step 725) then it may be determined in step 735 whether the device continues to process the audio source by further consulting (step 720) the sound table 186. When there is an indication in step 735 that no further processing is requested, then the device may store in memory 168 any successfully converted text as words. When there is further processing, steps (720, 725) may be repeated until there is indication otherwise. When a match or the like has been detected in step 725 then it may be determined in step 640 whether the converted text or word is a phone number.

Though the above aspects demonstrate hyperlink references may be generated from input, similar teachings may be applied to those skilled in the art by providing a user interface element such as a text box object as input. The text box object may be located anywhere and on any web page including a text box that may be embedded or displayed as part of an on-line advertisement. The text box object may be used in a stand-alone application or stored on magnetic and/or optical media that may be non-volatile, writable, removable, or portable. The text box object may be incorporated as an applet or servlet and embedded in other applications. The text box may be integrated in the task bar or any part of the GUI's OS, or the OS bypassed and a user interface element overlaid as a graphic on a display device based on modifications to a video card and/or it's associated firmware or software drivers. A command line text box may be further overlaid as an interactive object in other embodiments such as Internet television, cable television, digital television, or interactive television through an Internet appliance or set top box.

Those skilled in the art may make and use software code to function as a browser plug-in, which may be downloaded by a user to integrate into a command line or client browser 112. Modifying the source code of the browser program itself may be more desirable, in effect, enabling tens of millions of users to take advantages of more creative ways to use fictitious identifiers as a means to access a resolvable URI. For any of the above implementations, the resolvability of an HLD may be determined from either the client or server side of any host or node on the network including routers, resolvers, nameservers, etc.

Although the invention has been shown and described with respect to a certain preferred aspect or aspects, it is obvious that equivalent alterations and modifications will occur to others skilled in the art upon the reading and understanding of this specification and the annexed drawings. In particular regard to the various functions performed by the above described items referred to by numerals (components, assemblies, devices, compositions, etc.), the terms (including a reference to a "means") used to describe such items are intended to correspond, unless otherwise indicated, to any item which performs the specified function of the described item (e.g., that is functionally equivalent), even though not structurally equivalent to the disclosed structure which performs the function in the herein illustrated exemplary aspect or aspects of the invention. In addition, while a particular feature of the invention may have been described above with respect to only one of several illustrated aspects, such feature may be combined with one or more other features of the other aspects, as may be desired and advantageous for any given or particular application.

The description herein with reference to the figures will be understood to describe the present invention in sufficient detail to enable one skilled in the art to utilize the present invention in a variety of applications and devices. It will be readily apparent that various changes and modifications could be made therein without departing from the spirit and scope of the invention as defined in the following claims.

What is claimed is:

1. A method for communication processing, the method comprising:
   storing, by a client device, information records comprising a table of one or more keywords and associated operative functions, the table having at least one keyword programmed by a user of the client device;
   determining, by the client device, whether audio or text data of a broadcast includes one or more broadcasted keywords; and
   performing, by the client device, a series of the associated operative functions based on said one or more broadcasted keywords in response to determining that the one or more broadcasted keywords match one or more of the keywords in the table, while concurrently presenting output corresponding to said audio or text data during said broadcast, wherein the series of said associated operative functions comprises at least four of:
     placing a call using the one or more broadcasted keywords;
     comparing a performance history associated with the one or more broadcasted keywords;
     storing contact information derived from the one or more broadcasted keywords;
     determining a domain name having the one or more broadcasted keywords at least partially therein and generating a hyperlink from the domain name;
     searching a database device for advertising associated with the one or more broadcasted keywords; and
     performing an Internet search with the one or more broadcasted keywords.

2. The method, as set forth in claim 1, wherein performing, by the client device, the series of the associated operative functions comprises automatically performing the series of the associated operative functions with said one or more broadcasted keywords.

3. The method, as set forth in claim 1, wherein performing the Internet search further comprises presenting results of said Internet search.

4. The method, as set forth in claim 1, wherein searching for advertising associated with the one or more broadcasted keywords comprises searching an advertising cache.

5. The method, as set forth in claim 1, further comprising at least one of detecting or recognizing that said one or more broadcasted keywords includes at least one identifier.

6. The method, as set forth in claim 5, wherein said at least one identifier comprises a phone number and placing a call using the one or more broadcasted keywords further comprises performing at least one of speed dialing, autodialing, generating a hyperlink to hyperdial said phone number, or hyperdialing said phone number.

7. The method, as set forth in claim 5, wherein said at least one identifier comprises at least one set of lottery numbers and comparing the performance history associated with the one or more broadcasted keywords further comprises comparing said at least one set of said lottery numbers to a table of preselected lottery numbers.

8. The method, as set forth in claim 5, wherein said at least one identifier comprises at least one set stock symbol and comparing a performance history associated with the one or more broadcasted keywords further comprises providing a stock update from said stock symbol.

9. The method, as set forth in claim 5, wherein said at least one identifier comprises at least one zip code and storing contact information further comprises extracting a postal address preceding said zip code to store said postal address in an address book.

10. The method, as set forth in claim 1, wherein determining the domain name from the one or more broadcasted keywords further comprises bookmarking said domain name.

11. The method, as set forth in claim 1, further comprising:
    storing, by the client device, at least a portion of the audio data in a sound cache,
    determining, by the client device, whether at least one identifier can be recognized from any portion of said sound cache, and
    performing, by the client device, the series of the associated operative functions corresponding to said identifier in response to determining that said identifier can be recognized.

12. The method, as set forth in claim 11, wherein determining, by the client device, whether said at least one identifier can be recognized comprises determining whether any portion of said sound cache corresponds to any portion of a sound table having stored sounds, said stored sounds being correlated with at least one identifier.

13. The method, as set forth in claim 12, wherein said stored sounds comprise spoken sounds corresponding to at least one top level domain.

14. The method, as set forth in claim 11, further comprising determining, by the client device, whether to process a remaining portion of said audio data.

15. The method, as set forth in claim 1, further comprising:
    determining, by the client device, whether said audio or text data comprises one or more identifiers, and
    performing, by the client device, the series of the associated operative functions corresponding to said one or more identifiers in response to determining that said audio or text data comprises said one or more identifiers.

16. The method, as set forth in claim 15, wherein performing, by the client device, the series of the associated operative functions comprises:

generating, by the client device, an Internet search engine request corresponding to said one or more identifiers, and presenting, by the client device, results of said Internet search engine request.

17. The method, as set forth in claim 15, wherein performing, by the client device, the series of the associated operative functions comprises:

selecting, by the client device, at least one advertisement corresponding to said one or more identifiers, and presenting, by the client device, said at least one advertisement.

18. A communication processing apparatus, the apparatus comprising:

an input configured to receive a broadcast with at least one of audio or text data;

a memory storing information records comprising a table of one or more keywords and associated operative functions, the table having at least one keyword programmed by a user of the communication processing apparatus; and a processor device in communication with the memory and the input, programmed to:

determine whether the audio or text data of the broadcast includes one or more broadcasted keywords; and perform a series of the associated operative functions with the one or more broadcasted keywords in response to determining that the one or more broadcasted keywords match one or more of the keywords in the table, while presenting output corresponding to the audio or text data during the broadcast, wherein the series of said associated operative functions comprises at least four of:

placing a call using the one or more broadcasted keywords;

comparing a performance history associated with the one or more broadcasted keywords;

storing contact information derived from the one or more broadcasted keywords;

determining a domain name having the one or more broadcasted keywords at least partially therein and generate a hyperlink from the domain name;

searching a database device for advertising associated with the one or more broadcasted keywords; and performing an Internet search with the one or more broadcasted keywords.

19. The apparatus of claim 18, wherein the processor device programmed to perform the Internet search is further programmed to present results of the Internet search.

20. The apparatus of claim 18, wherein the processor device programmed to search for advertising associated with the one or more broadcasted keywords is further programmed to search an advertising cache.

21. The apparatus of claim 18, wherein the processor device is further programmed to at least one of detect or recognize that the one or more broadcasted keywords includes at least one identifier.

22. The apparatus of claim 18, wherein the processor device is further programmed to:

store at least a portion of the audio data in a sound cache;

determine whether at least one identifier can be recognized from any portion of the sound cache; and perform the series of the associated operative functions corresponding to the identifier in response to determining that the identifier can be recognized.

23. The apparatus of claim 18, wherein the processor device is further programmed to:

determine whether the audio or text data comprises one or more identifiers; and perform the series of the associated operative functions corresponding to the one or more identifiers in response to determining that the audio or text data comprises the one or more identifiers.

24. A non-transitory computer readable medium having instructions stored thereon, the instructions configured to cause a device to perform operations comprising:

storing information records comprising a table of one or more keywords and associated operative functions, the table being having at least one keyword programmed by a user of the device;

determining whether audio or text data of a broadcast includes one or more broadcasted keywords; and performing a series of the associated operative functions based on said one or more broadcasted keywords in response to determining that the one or more broadcasted keywords match one or more of the keywords in the table, while concurrently presenting output corresponding to said audio or text data during said broadcast, wherein the series of said associated operative functions comprises at least four of:

placing a call using the one or more broadcasted keywords;

comparing a performance history associated with the one or more broadcasted keywords;

storing contact information derived from the one or more broadcasted keywords;

determining a domain name having the one or more broadcasted keywords at least partially therein and generating a hyperlink from the domain name;

searching a database device for advertising associated with the one or more broadcasted keywords; and performing an Internet search with the one or more broadcasted keywords.

25. The non-transitory computer readable medium of claim 24, wherein the performing the Internet search further comprises presenting results of the Internet search.

26. The non-transitory computer readable medium of claim 24, wherein searching for advertising associated with the one or more broadcasted keywords comprises searching an advertising cache.

27. The non-transitory computer readable medium of claim 24, the operations further comprise at least one of detecting or recognizing that the one or broadcasted more keywords includes at least one identifier.

28. The non-transitory computer readable medium of claim 24, the operations further comprising:

storing at least a portion of the audio data in a sound cache;

determining whether at least one identifier can be recognized from any portion of the sound cache; and performing the series of the associated operative functions corresponding to the identifier in response to determining that the identifier can be recognized.

29. The non-transitory computer readable medium of claim 24, the operations further comprising:

determining whether the audio or text data comprises one or more identifiers; and performing the series of the associated operative functions corresponding to the one or more identifiers in response to determining that the audio or text data comprises the one or more identifiers.

* * * * *